United States Patent [19]

Seki et al.

[11] Patent Number: 4,996,954
[45] Date of Patent: Mar. 5, 1991

[54] METHOD FOR DETECTING AN IRREGULARITY IN VALVE-TIMING CHANGEOVER IN AN ENGINE

[75] Inventors: Yasunari Seki; Yuzuru Koike; Takashi Sato; Masatoshi Obata, all of Tochigi, Japan

[73] Assignee: Honda Giken Kogyo Kabushiki Kaisha, Tokyo, Japan

[21] Appl. No.: 388,235

[22] Filed: Aug. 1, 1989

[30] Foreign Application Priority Data

Aug. 1, 1988 [JP] Japan .................... 63-192241
Aug. 1, 1988 [JP] Japan .................... 63-192243

[51] Int. Cl.⁵ .............................. F01L 1/34
[52] U.S. Cl. ................ 123/90.16; 123/90.15
[58] Field of Search ........... 123/90.12, 90.15, 90.16

[56] References Cited

U.S. PATENT DOCUMENTS

| | | | |
|---|---|---|---|
| 4,033,304 | 7/1977 | Luria | 123/90.12 |
| 4,534,323 | 8/1985 | Kato et al. | 123/90.16 |
| 4,545,342 | 10/1985 | Nakano et al. | 123/90.16 |
| 4,759,322 | 7/1988 | Konno | 123/90.16 |
| 4,800,850 | 1/1989 | Yoshida et al. | 123/90.16 |
| 4,807,574 | 2/1989 | Shibata et al. | 123/90.16 |
| 4,876,995 | 10/1989 | Otobe et al. | 123/90.16 |

Primary Examiner—David A. Okonsky
Assistant Examiner—Weilun Lo
Attorney, Agent, or Firm—Lyon & Lyon

[57] ABSTRACT

A method for detecting an irregularity in the valve-timing changeover in an engine having a valve operating mechanism capable of operating the intake valves or exhaust valves, or both, in a different manner, known as valve timing, such as the magnitude of valve lift or the duration the valve remains open, for improving the operation of the engine at different engine speeds. The method compares the oil pressure in the supply passage to the valve timing changeover mechanism with the oil pressure that should exist after the changeover caused by the latest instruction to determine an irregularity if the pressures are not equal. A time delay may be used to accommodate the inherent time lay in the changeover to avoid a premature determination of an irregularity. An alarm may be energized or a fail-safe procedure initiated when an irregularity is detected.

4 Claims, 8 Drawing Sheets

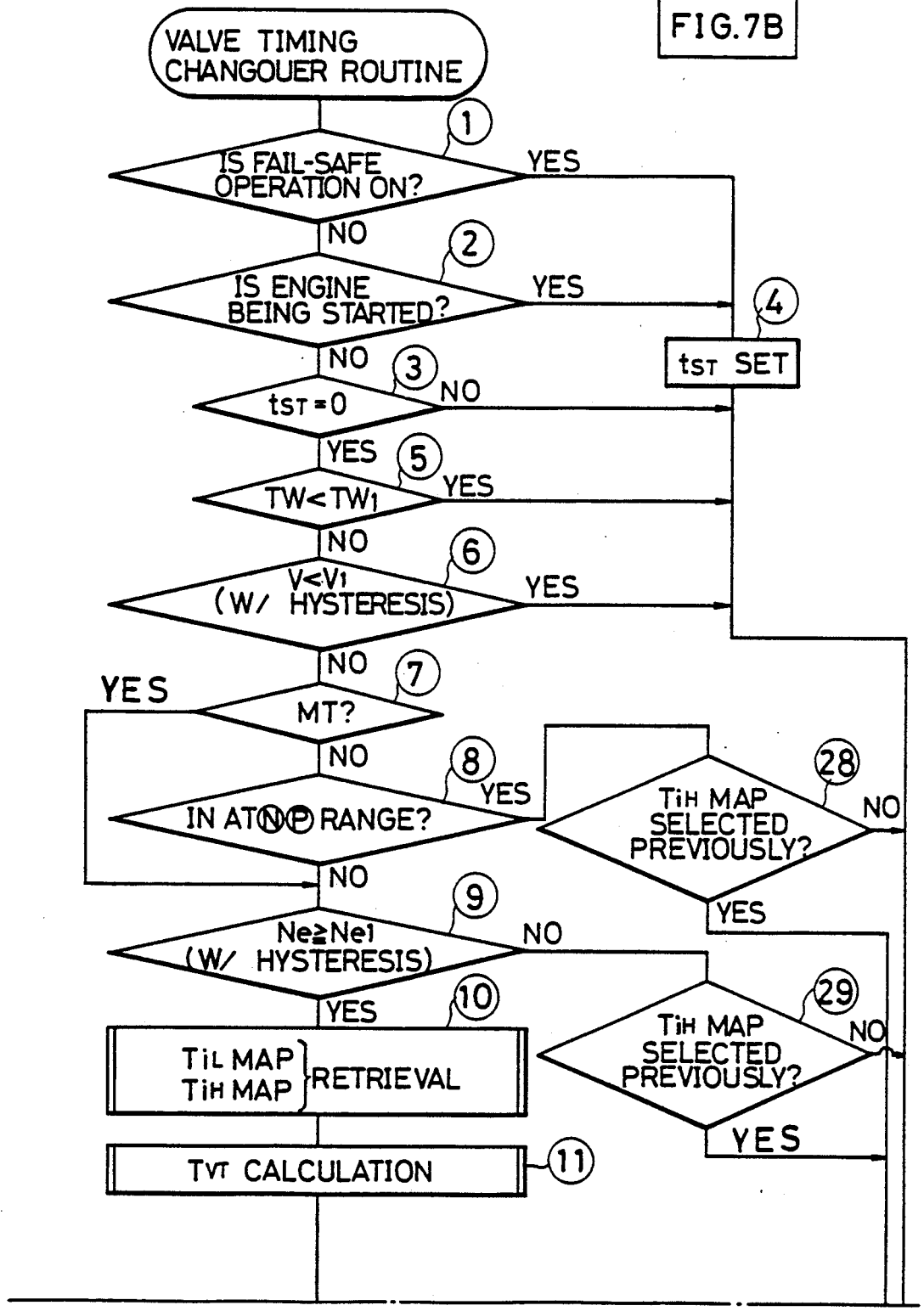

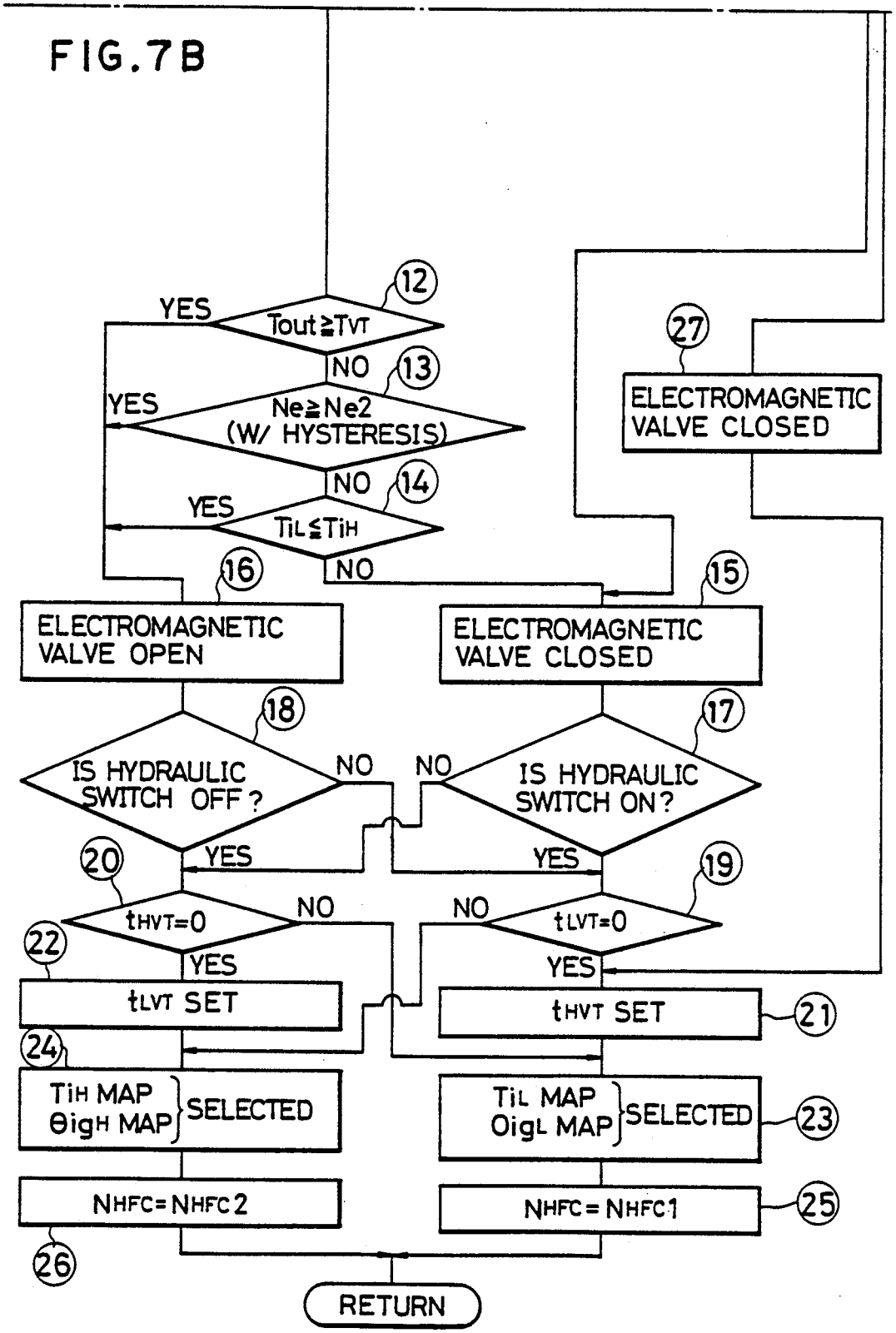

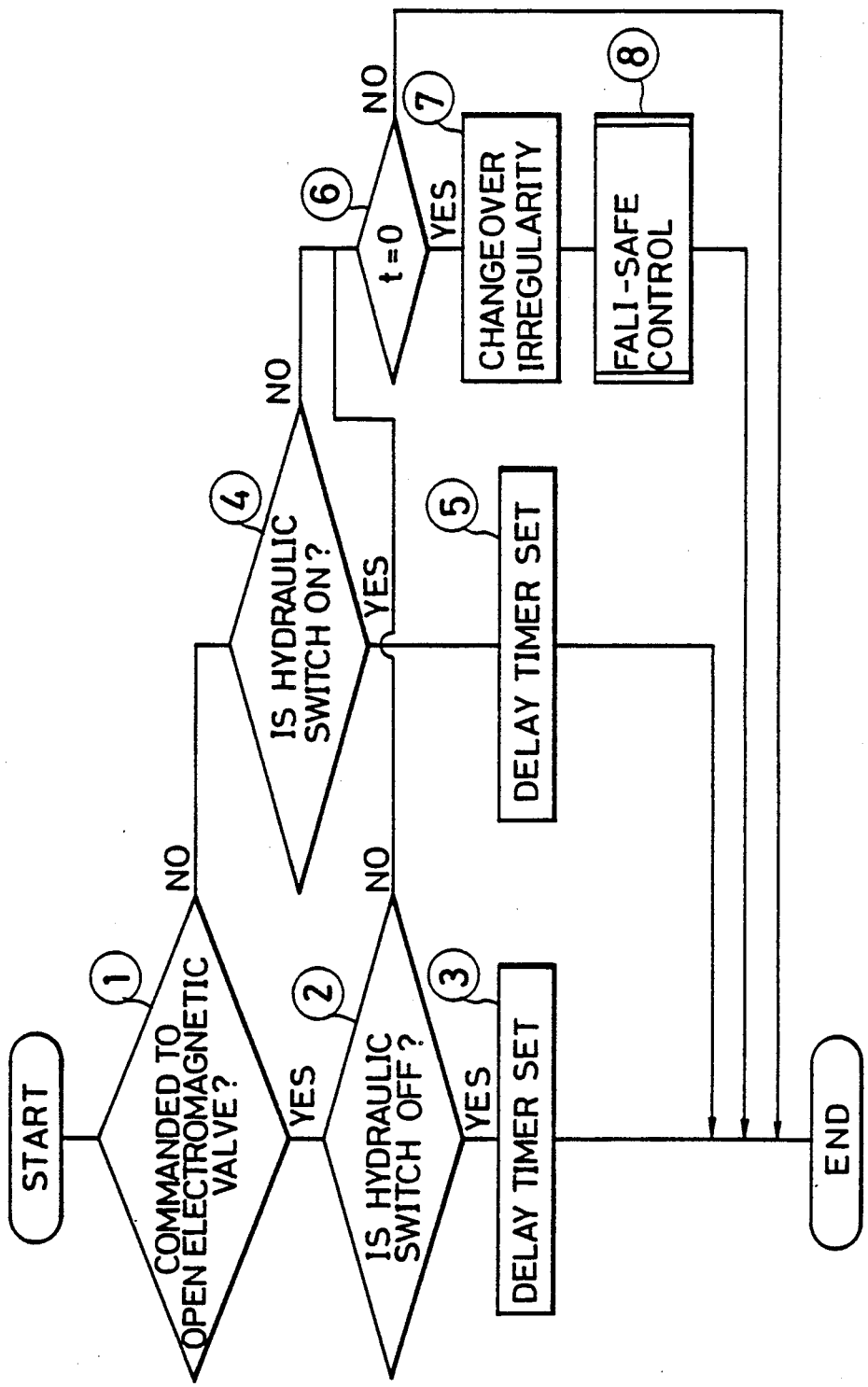

METHOD FOR DETECTING AN IRREGULARITY IN VALVE-TIMING CHANGEOVER IN AN ENGINE

BACKGROUND OF THE INVENTION

This invention relates to a control method for detecting an irregularity in the valve-timing changeover for internal combustion engines that have selectable modes of valve-timing operation.

There has been known heretofore from the Japanese Examined Patent Application Publication No. Tokko-sho 49-33289 an engine in which a cam shaft provided with a high-speed cam and a low-speed cam is shifted in the axial direction by activating cylinder operation to change over valve timing as desired between a low-speed valve timing at which the intake and exhaust valves are opened and closed by the low-speed cam and a high-speed valve timing at which the intake and exhaust valves are opened and closed by the high-speed cam wherein the changeover of the valve timing is made by opening and closing operation of valve means that control charging oil to and discharging oil from the activating cylinders.

When a hydraulically operated changeover mechanism is used to change over the valve timing as described in the foregoing, sometimes the valve means is not able to provide the predetermined hydraulic pressure changes as expected when instructed to open or close due to sticking of the valve means caused by foreign material clinging thereto or oil leakage or the like, with the result that the valve timing is not changed over normally. It therefore is desirable that a fail-safe arrangement be provided to cope with such a situation which arrangement may including, for example, an alarm to give out a warning, a signal to decrease fuel supply or invalidate the control action for changeover of the valve timing, or the like.

It is, therefore, an object of the present invention to provide an irregularity-detecting method for accomplishing a desirable fail-safe control in a valve-timing changeover mechanism.

SUMMARY OF THE INVENTION

To achieve the above object, the present invention provides an irregularity-detecting method for a variable valve-timing type engine in which valve timing for at least one of either the intake valves or the exhaust valves in the engine is changed over by a hydraulically operated change-over mechanism, which method includes the steps of: detecting by a hydraulic pressure detecting means an oil pressure in an oil supplying passage for supplying oil to the changeover mechanism; making a comparison between an open/close command or instruction given out to a valve means to control oil supplied to the oil supplying passage and signals representing the oil pressure detected by said hydraulic pressure detecting means; and determining through said comparison an irregularity in the valve timing changeover.

The valve timing changeover herein refers to changing one or both of the valve-open duration and valve-lift amount. The valve timing changeover referred to herein also an arrangement in a multi-valve engine wherein any one of a plurality of intake or exhaust valves for each cylinder of the engine is closed and disabled according to the operating condition of the engine.

When the oil pressure is not changed in accordance with an open-close instruction given to the valve means due to sticking or oil leakage of the valve means, such is detected and determined as an irregularity in the valve timing changeover operation, so that a desirable fail-safe operation is performed.

There is a slight time lag between the time when an instruction to open or close the valve means is given and the time when the oil pressure is actually changed in response to the instruction due to a natural response delay of the valve means and duct-line resistance. In such case, if whether or not the valve timing changeover is being carried out normally is determined only after a lapse of a predetermined time following the giving of the instruction to open or close the valve means, an erroneous fail-safe operation due to such time lag can be prevented when the valve timing changeover is being carried out normally.

BRIEF DESCRIPTION OF THE DRAWINGS

FIG. 7, comprising FIGS. 7A and 7B, is a flowchart of the valve timing changeover control routine;

FIG. 10 is a flowchart of the subroutine for determining a valve timing changeover irregularity and for accomplishing a fail safe control of the valve timing changeover.

DETAILED DESCRIPTION OF THE PREFERRED EMBODIMENT

Figure 1:
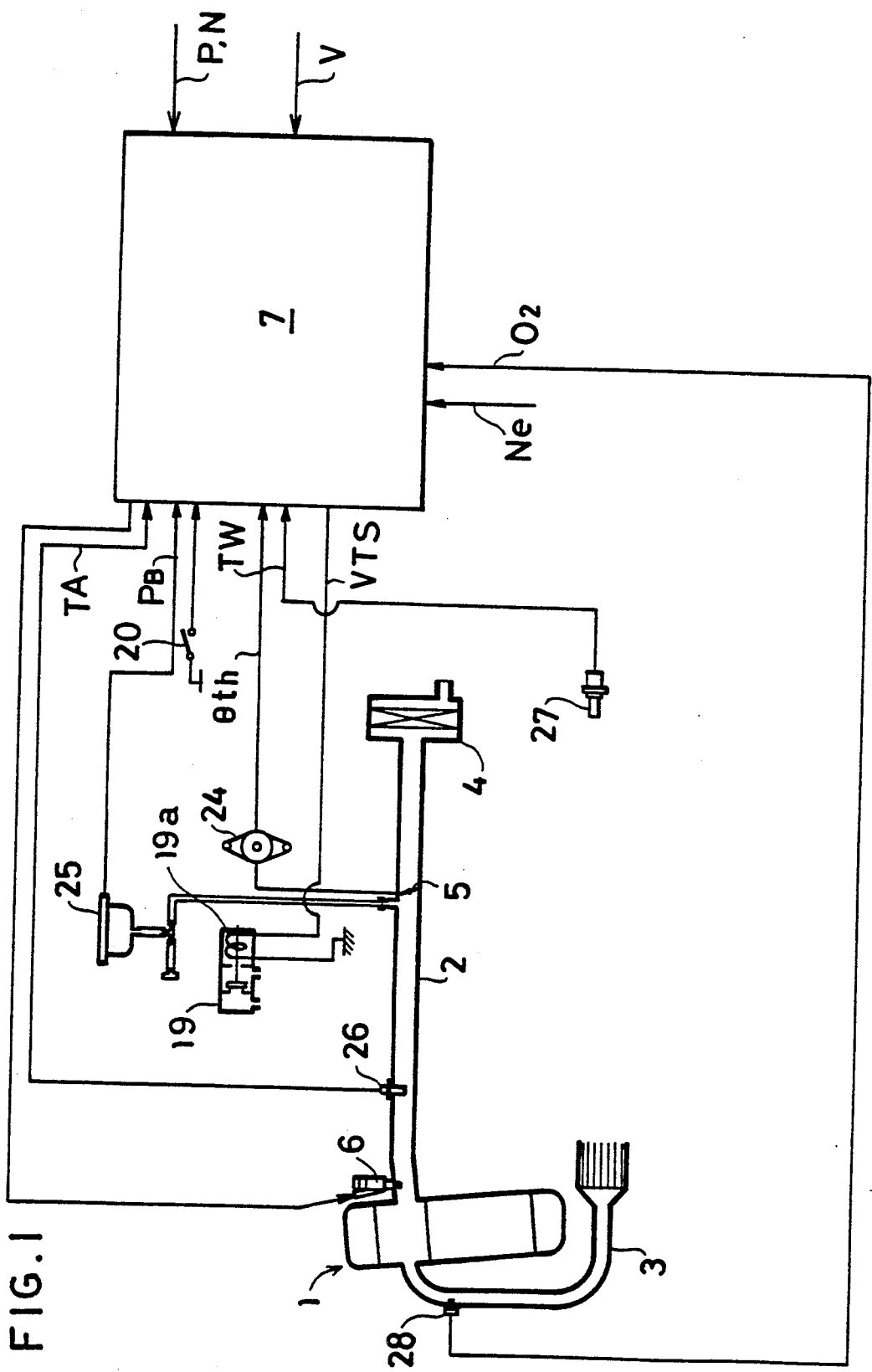
FIG. 1 is a schematic diagram of the components of an internal combustion engine and controls for describing the method of the present invention applied to that engine.

Referring to FIG. 1, an engine body 1 is diagrammatically shown and has an intake passage 2 and an exhaust passage 3. The intake passage 2 is provided with an air cleaner 4, a throttle valve 5 and an injector 6 in that order from the upstream side. The quantity of fuel injection made through said injector 6 is variably controlled by an electronic control circuit 7. This engine is of the electronically controlled fuel injection type.

Figure 2:
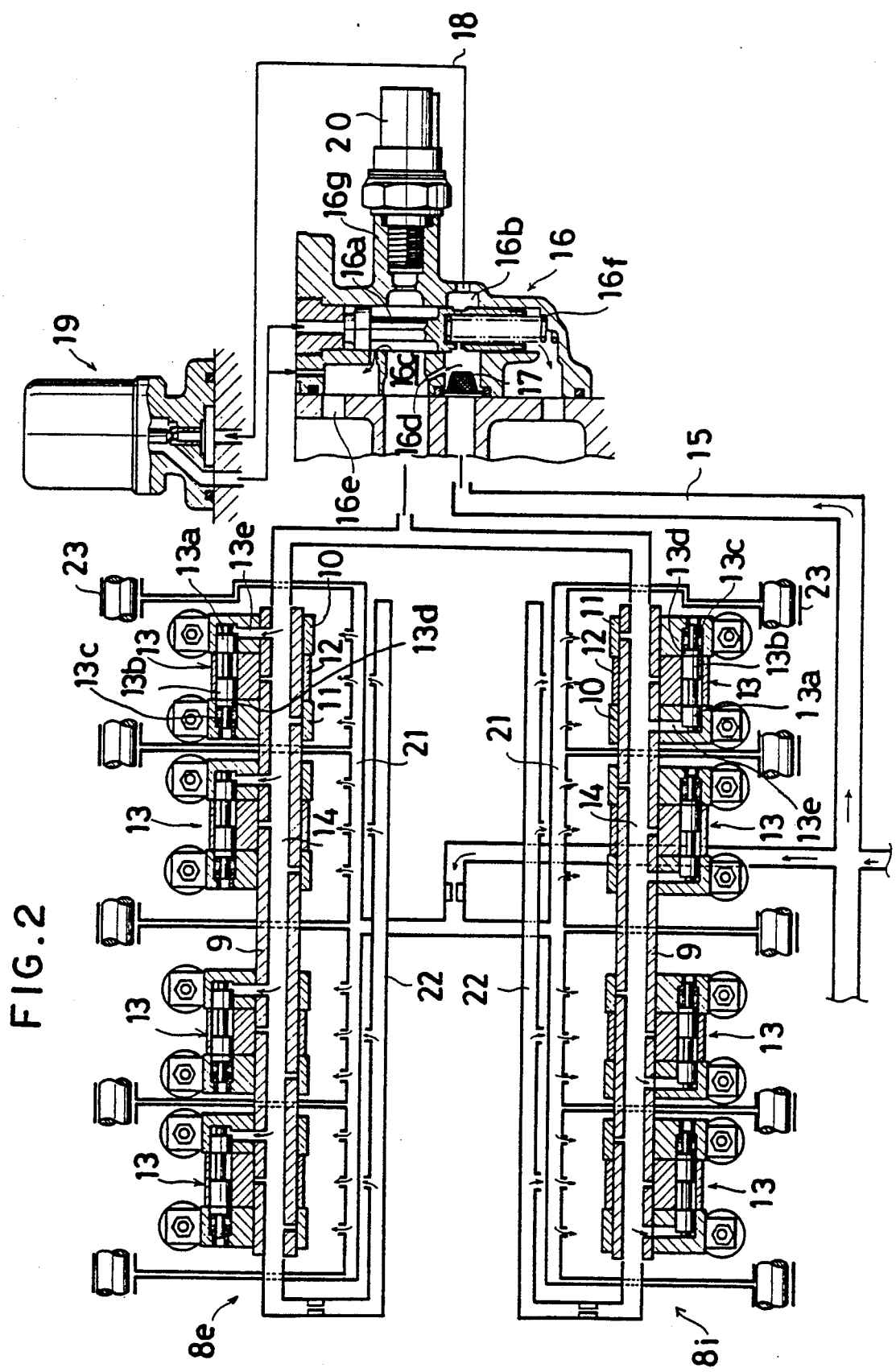
FIG. 2 is a schematic diagram illustrating a valve timing changeover mechanism for operating in accordance with this invention.

The engine to be described in connection with this example of the present invention is a double overhead cam (DOHC), in-line four-cylinder engine having a pair of intake and a pair of exhaust valves for each cylinder. As shown in FIG. 2, the engine is provided with a valve operating mechanism 8$i$ at the intake valve side and another valve operating mechanism 8$e$ at the exhaust valve side for causing these intake and exhaust valves to open and close.

Both of the valve mechanisms 8i and 8e are basically of the same construction, so that a detailed explanation will be made only of the intake side valve mechanism hereinbelow. Note that both of said valve mechanisms are assigned the same symbols and reference numerals for their corresponding parts.

The intake-side valve mechanism 8i includes a rocker shaft 9 for the intake valves; a pair of driving rocker arms 10, 11 pivotally supported on the rocker shaft 9 for driving a pair of the intake valves of each cylinder and a free rocker arm 12 located intermediately between said pair of driving rocker arms 10, 11 and also pivotally supported on said rocker shaft 9. The driving rocker arms 10, 11 are engaged by a low-speed cam formed on a cam shaft for the intake valves and the free rocker arm 12 is engaged by a high-speed cam formed on the cam shaft. A changeover mechanism 13 is provided by which both the driving rocker arms 10, 11 are detachably connected to the free rocker arm 12. In this arrangement, when the driving rocker arms 10, 11 are disconnected from the free rocker arm 12, the intake valves are operated to open and close with a low-speed valve timing by which the valve-open duration and the valve-lift amount are made relatively smaller by means of the low-speed cam. On the other hand, when these arms are connected to each other, through free rocker arm 12, the intake valves are operated at a high-speed valve timing by which the valve-open duration and the valve-lift amount are relatively larger.

The changeover mechanism 13 includes a first connecting pin 13a slidable mounted in the first rocker arm 10 and which can be engaged with and disengaged from the free rocker arm 12, a second connecting pin 13b slidable mounted in the free rocker arm 12 and which can be engaged with and disengaged from the second driving rocker arm 11, and a restriction pin 13d urged towards the free rocker arm 12 by a spring 13 inserted in the second driving rocker arm 11. The first driving rocker arm 10 is provided with a hydraulic chamber 13e for supplying an oil pressure to urge the first connecting pin 13a towards the free rocker arm 12. The hydraulic chamber 13e is in communication with an oil supplying passage 14 formed in the rocker shaft 9. When the hydraulic chamber 13e is charged with a hydraulic oil through the oil-supplying passage 14, the first connecting pin 13a becomes engaged with the free rocker arm 12 and, pushed by the first connecting pin 13a, the second connecting pin 13b becomes engaged with the second driving rocker arm 11, so that both the driving rocker arms 10, 11 and the free rocker arm 12 are connected to each other to change the valve timing to a high-speed valve timing. On the other hand, when the oil pressure in the hydraulic chamber 13e is lowered, the second and the first connecting pins 13b and 13a are urged in the opposite direction by the spring 13c through the restriction pin 13d and thus pushed back into the free rocker arm 12 and the first driving rocker arm 10, respectively, so as to disconnect both of the driving rocker arms 10, 11 from the free rocker arm 12 and change the valve timing to a low-speed valve timing.

An oil passage 15 for supplying oil from an oil pump (not shown) is connected to the aforementioned oil supplying passage 14 through a changeover valve 16 attached to an end portion of the cylinder head. When the spool type valve body 16a of the changeover valve 16 is positioned at the upper (closed) position, an inlet port 16b which communicates with the oil passage 15 through an oil filter 17 and an outlet port 16c which communicates with the oil supplying passage 14 may communicate with each other only through an orifice 16d. At this time, the outlet port 16c is also in communication with a drain port 16e which opens into an upper space in the cylinder head with the result that the oil pressure in the oil supplying passage 14 decreases. When the spool type valve body 16a is shifted to the lower (open) position, the inlet port 16b and the outlet port 16c are in communication with each other through an annular groove provided in the spool type valve body 16a while the outlet port 16c becomes disconnected from the drain port 16e, so that the oil pressure in the oil supplying passage 14 is increased.

The spool type valve body 16a is arranged such that the changeover thereof to the open position is carried out against the urging force of a spring 16f by pilot pressure inputted to the top of the valve body 16a through a pilot oil passage 18 branching out from the inlet port 16b. The pilot oil passage 18 is provided with a normally closed type electromagnetic valve 19. An electric current to energize the solenoid 19a of the electromagnetic valve 19 is controlled by output signal VTS from the electronic control circuit 7 as shown in FIG. 1. When the electromagnetic valve 19 is opened upon the energization of the solenoid 19a, the spool type valve body 16a is moved to its open position by oil pressure applied to the top of the spool type valve body 16a so that the valve timing is changed over to a high-speed one as described in the foregoing. When the electric current energizing the solenoid 19a is stopped to close the electromagnetic valve 19, the spool type valve body 16a is moved to the closed position by the spring 16f and oil pressure in port 16b so that the valve timing is changed over to a low-speed one.

In addition, in order to confirm the changeover operation of the spool type valve body 16a, there is provided on the housing 16g for the changeover valve 16 a hydraulic switch 20 that detects oil pressure at the outlet port 16c and turns on when the detected oil pressure is low and turns off when the detected oil pressure is high.

A lubricant passage 21 is provided for the valve mechanism, a separate lubricant passage 22 is provided for the high-speed valve timing operation of the valve mechanism, and a cam holder 23 is also provided with lubrication. The valve timing changeover means and oil passage arrangement described above are not particularly different from those disclosed in the Japanese Utility Model Registration Application No. Jitsugan Sho 63-82588 filed on June 22, 1988 by the applicants of the present patent application and is not part of the present invention whereby any further detailed explanation thereof is omitted.

Inputted into the electronic control circuit 7 are engine revolution speed (Ne) signals from an engine revolution speed sensor (not shown), throttle opening-degree ($\Theta$ th) signals from a throttle opening sensor 24, intake negative pressure ($P_B$) signals and intake air temperature (TA) signals from a pressure sensor 25 and a temperature sensor 26, respectively, both of which are connected to the intake passage 2 downstream of the throttle valve 5, water temperature (TW) signals from a water temperature sensor 27, vehicle speed (V) signals from a vehicle speed sensor (not shown), signals from the aforesaid hydraulic switch 20, and $O_2$ signals from an oxygen concentration sensor 28 provided in the exhaust passage 3 and, in case of an automatic transmission car, additionally, parking (P) and neutral (N) signals from a shift lever position switch (not shown). Based on the operating condition determined from these signals, an appropriate fuel injection quantity is calculated and a suitable valve timing selected.

A determination of the fuel injection quantity is by the following equation:

$$Tout = K_1 Ti + K_2$$

where Tout stands for fuel injection quantity, Ti for standard fuel injection quantity, $K_1$ for correction factor, and $K_2$ for constant term. It should be noted that $K_1$ used herein may include: an intake temperature correction factor $K_{TA}$ by which the fuel injection quantity is increased when the intake temperature and/or the water temperature are low; a high-load fuel increase factor $K_{WOT}$ by which the fuel injection quantity is increased in a prescribed high-load region determined by the water temperature correction factor $K_{TW}$, Ne, $P_B$ and a Θ th; and a feedback correction factor $KO_2$ by which a deviation of the air/fuel (A/F) ratio from the theoretical value of A/F ratio in an $O_2$ feedback region with a comparatively low engine revolution speed (say, 4,000 rpm or lower) is corrected, while $K_2$ includes a fuel increase constant for acceleration by which the fuel injection quantity is increased during acceleration of a car.

The standard fuel injection quantity Ti is set in such a manner that an intake mixture, in combination with a quantity of air intake into a cylinder in a particular operating condition determined by Ne and PB, may provide a desired A/F ratio close to the desired theoretical value of A/F ratio. Two sets of Ti maps, one for the low-speed valve timing and the other for the high-speed valve timing, are prepared and stored in the electronic control circuit 7.

Figure 3:
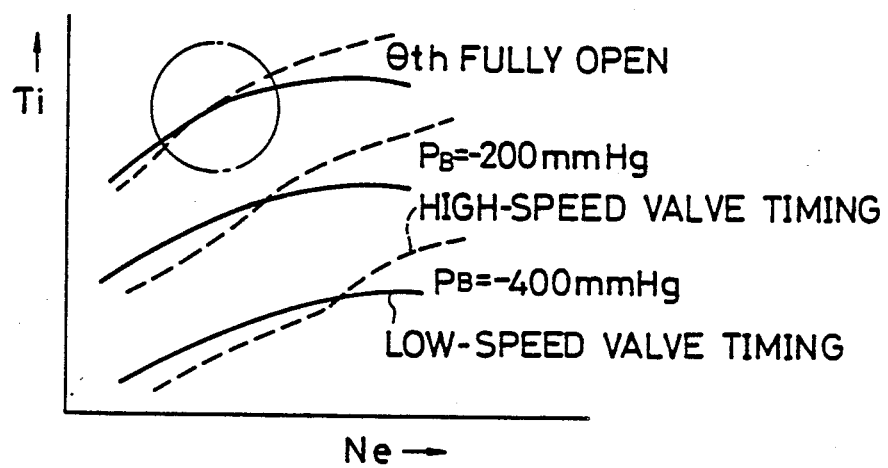
FIG. 3 is a diagram showing the characteristic curves for fuel injection quantities set for the high-speed valve timing and the low-speed valve timing.

In FIG. 3, the Ti value in the Ti map for the low-speed valve timing is indicated by a solid line curve while the Ti value in the Ti map for the high-speed valve timing is indicated by a dotted line curve. As is clear from FIG. 3, the intake air quantity which is related to Ti tends to level off with the increase of Ne at the low-speed valve timing. On the other hand, at the high-speed valve timing, the intake air quantity keeps on increasing further to eventually surpass that at the low-speed valve timing as the charging efficiency increases with the increase of Ne, so that the Ti value for the low-speed valve timing and that for the high-speed valve timing coincide with each other at some point on the curves for each intake pressure. At this point, the air intake quantity is the same whether at the low-speed or high-speed valve timing and so is the A/F ratio. Therefore, the engine output is also practically the same at this point.

Figure 4:
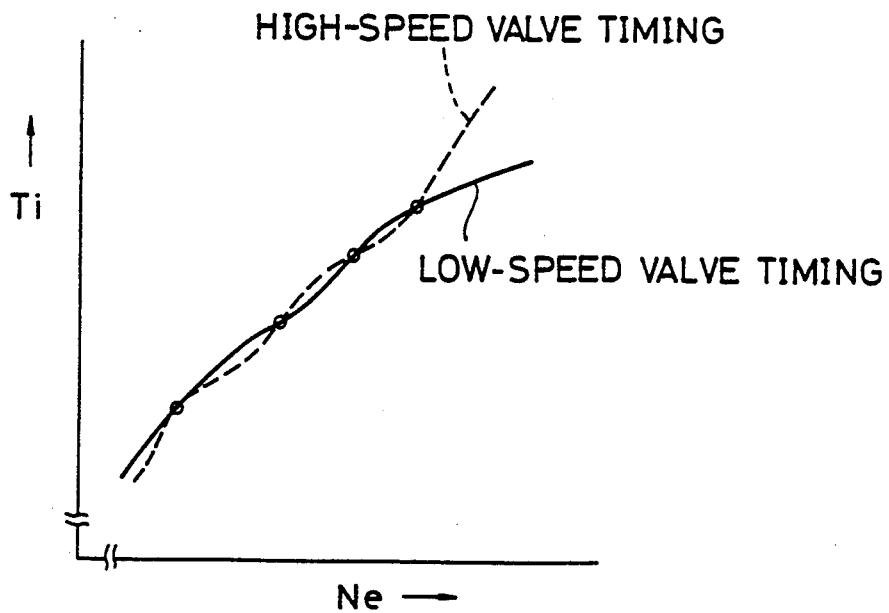
FIG. 4 is an enlarged view of the portion encircled in the diagram of FIG. 3.

The charging efficiency subtly fluctuates with the change of Ne. This fluctuation becomes more conspicuous in the range approaching the point at which the throttle opening (Θ th) is fully open so that, as shown in FIG. 4, the Ti value for the low-speed valve timing and that for the high-speed valve timing become equal to each other at a plurality of points. As will be discussed later, when the valve timing is changed over at one of these points where the Ti value for the low-speed valve timing and that for the high-speed valve timing become equal to each other, the valve timing changeover is more likely to cause a hunting, especially in the range where the throttle opening is large, thus adversely affecting durability of the changeover mechanism 13.

Figure 5:
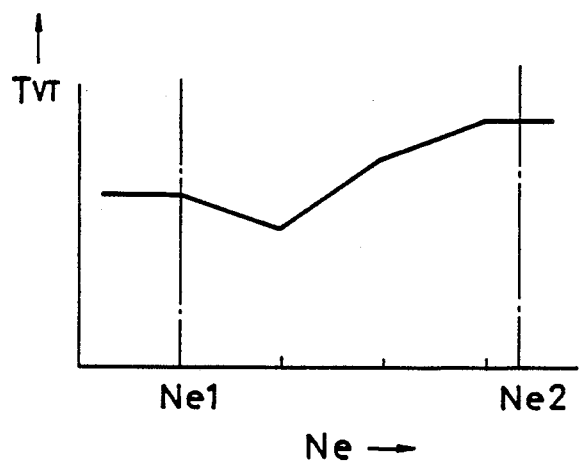
FIG. 5 is a diagram showing the $Ti_{VT}$ table.

In the high-load region, the mixture is enriched according to the above-mentioned high-load fuel increase factor $K_{WOT}$. Since a higher output can be brought about with the high-speed valve timing in this high-load region, a high-load determinant reference value $T_{VT}$ based on the fuel injection quantity is experimentally obtained as shown in FIG. 5. A $T_{VT}$ value corresponding to Ne is calculated from a $T_{VT}$ table and when Tout is greater than $T_{VT}$, the valve timing is changed over to the high-speed valve timing will be explained later. In such a case, if it is prearranged such that the Tout $\geq T_{VT}$ region includes regions in which, as discussed in the foregoing, the Ti values for the low speed valve timing and the high-speed valve timing become equal to each other, the above mentioned hunting occurring with changeover of the valve timing can be prevented. A $T_{VT}$ table applicable to an automatic transmission vehicle is different from that applicable to a manual vehicle.

In order to prevent an over-revolution speed of the engine, fuel is cut when Ne exceeds the revolution limiter value $N_{HFC}$. If a load acting on the timing belt is considered in this connection, it can be seen that the shorter the valve-open duration is, the greater the acceleration of the valve opening operation and, as a result, the load on the timing belt becomes greater, while the revolution speed Ne which causes a valve jump becomes lower due to an increase in the valve acceleration rate. Therefore, an allowable revolution speed of the engine should be different between the low-speed valve timing in which the valve-open duration is shorter and the high-speed valve timing in which the valve-open duration is longer, so that in this example the revolution limiter value is set at a comparatively low one $N_{HFC1}$ (for example, 7500 rpm) for the low-speed valve timing and at a comparatively high one $N_{HFC2}$ for example, 8100 rpm) for the high-speed valve timing.

Figure 6:
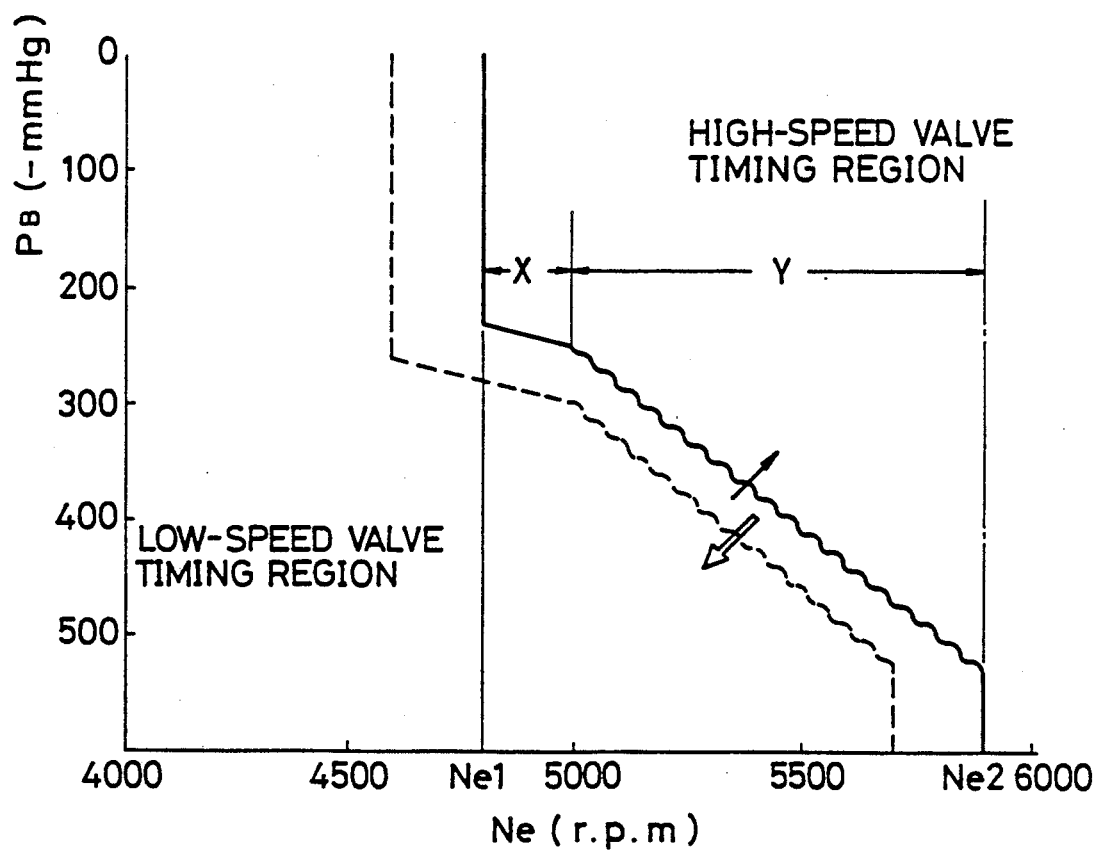
FIG. 6 is a diagram showing the valve timing changeover characteristics.

Next, referring to FIG. 6, explanation will now be made of valve timing changeover characteristics. In FIG. 6, the solid-line curve shows the changeover characteristics observed when the valve timing is changed over from the low-speed valve timing to the high-speed valve timing, while the dotted-line curve shows the changeover characteristics observed when changed over in the opposite way.

A valve timing changeover is performed in a region of the engine revolution speeds ranging between the lower-limit engine revolution speed Ne1 at which the engine output obtained with the low-speed valve timing always exceeds that obtained with the high-speed valve timing and the upper-limit engine revolution speed Ne2 at which the engine output obtained with the high-speed valve timing always exceeds that obtained with the low-speed valve timing. In this example of the present invention, the valve timing changeover from the low-speed one to the high-speed one and vice versa are so set as to have a hysteresis; for example, Ne1 set at 4800 rpm/4600 rpm and Ne2 at 5900 rpm/5700 rpm.

In FIG. 6, the region or range represented by X is one in which the valve timing changeover is performed through comparison of $T_{VT}$ with Tout while the region or range denoted by Y is one in which the valve timing changeover is performed through a comparison made between a Ti value in the Ti map (hereinafter referred to as $Ti_L$ map) for the low-speed valve timing and a Ti value in the Ti map (hereinafter referred to as $Ti_H$ map) for the high-speed valve timing. Since the changeover characteristic in the X region is affected also by parameters other than Ne and $P_B$ having much to do with the calculation of Tout, it can not be shown exactly in a graph such as FIG. 6 in which the horizontal axis represents Ne and the vertical axis represents $P_B$, whereby the graph shown therein is only for illustration purposes.

Next, referring to FIG. 7, we will now explain the control accomplished by the electronic control circuit 7 of the valve timing changeover, that is, the control program for the output of the signal VTS to the electromagnetic valve 19. A step-1 is one for determining whether or not signals from the respective sensors are being normally inputted into the electronic control circuit 7 or, in other words, one for determining whether to start a fail safe operation. A step-2 is one for determining whether or not the engine is being started and a step-3 is one for determining whether or not the remainder time $t_{ST}$ of the delay timer has elapsed to 0. A time setting for $t_{ST}$ (e.g. 5 seconds) is performed in a step-4 during the engine starting so that the timing operation may start after the start of the engine. A step-5 is one for determining whether or not the water temperature TW is lower than the preset one TW1 (for instance, 60° C.), that is, whether or not the warming up of the engine has been achieved. A step-6 is one for determining whether or not the vehicle speed V is lower than the preset lowest vehicle speed VI (for instance, 8 km/5 km per hour with a hysteresis), a step-7 is for determining whether or not it is a manual transmission vehicle (MT), a step-8 is for determining, in case of an automatic transmission vehicle (AT), whether the shift lever is set at the parking (P) position or the neutral (N) position, and a step 9 is for determining whether or not Ne is greater than the above mentioned lower-limit value Ne1, so that when the fail-safe operation is going on or the engine is being started or the time preset with the delay timer has not elapsed as yet after the start of the engine, or the warming up of the engine is going on, or the vehicle is parked or running at a slow speed, or the shift gear is set at P or N position, or Ne is smaller than Ne, the electromagnetic valve 19 is closed to hold the valve timing set at the low-speed valve timing as will be explained later.

When it is determined at the step-9 that the $Ne \geq Ne1$ the $Ti_L$ map and the $Ti_H$ map are retrieved at a step-10 in order to obtain a Ti value in the $Ti_L$ map (said value being hereinafter referred to as $Ti_L$) and a Ti value in the $Ti_H$ map (said value being hereinafter referred to as $Ti_H$) which correspond to the current Ne and $P_B$. Then, in a next step-11, a $T_{VT}$ corresponding to Ne is calculated from the $T_{VT}$ table. In a step-12 this $T_{VT}$ is compared with Tout obtained previously (that is, Tout obtained in the immediately preceding round of operation) to determine whether or not $Tout \geq T_{VT}$, that is, to determine whether it is in the high-load condition in which the mixture is enriched. When it is found Tout is smaller than $T_{VT}$, the program is advanced to step-13 for determining whether Ne is higher than the aforementioned upper-limit value Ne2 or not. If it is found that Ne is smaller than Ne2, the program is advanced to a step-14 to compare $Ti_L$ and $Ti_H$ with each other, both of which have been obtained at the step-10 and, if $Ti_L$ is larger than $Ti_H$ ($Ti_L > Ti_H$), a command or instruction to close the electromagnetic valve 19 is given out at a step-15, said instruction being tantamount to one to change over the valve timing to the low-speed valve timing. When $Tout \geq T_{VT}$, $Ne \geq Ne_2$, or $Ti_L \leq Ti_H$, a command or instruction to open the electromagnetic valve 19, that is, an instruction to change over the valve timing to the high-speed valve timing, is given in a step-16. Further, when an instruction to open the valve 19 in the step-15 has been given, it is determined at a step-17 whether or not the hydraulic switch 20 has been turned on, that is, whether or not the oil pressure in the oil supplying passage 14 has been reduced to a low level. When the hydraulic switch 20 has been turned on, whether or not the remainder time $t_{LVT}$ for the low-speed valve timing changeover delay timer has been reduced to 0 is determined at a step-19. When it is found that $t_{LVT}=0$, the remainder time $t_{HVT}$ for the high-speed valve timing changeover delay timer is set to a predetermined time (for example, 0.1 sec.) at a step-21. Next, at a step-23, a selection processing is performed to select the $Ti_L$ map as the Ti map for use with a fuel injection control routine, and the ignition timing map for the low-speed valve timing ($\Theta$ igL map) as an ignition timing map, respectively. Then, at a step-25, a processing is performed so as to turn the revolution limiter value $N_{HFC}$ to the value $N_{HFC1}$ for the low-speed valve timing.

When the instruction to open the valve 19 has been given at the step-16, it is determined at a step-18 whether or not the hydraulic switch 20 is turned off, that is, to determine whether or not the oil pressure in the oil supplying passage 14 has increased to a higher level. When the hydraulic switch 20 has been turned off, it is at a step-20 in which whether or not the remainder time $t_{HVT}$ for the high-speed valve timing changeover delay timer has been reduced to 0. If it is found that $t_{HVT}=0$, the remainder time $t_{LVT}$ for the low-speed valve timing changeover delay timer is set to a predetermined time (for example, 0.2 second) at a step-22. Next, at a step-24, a selection process is performed to select the $Ti_H$ map as the Ti map for use with the fuel injection control routine, and the ignition timing map for the high-speed valve timing ($\Theta$ igH) as an ignition timing map, respectively. Then, at a step-26, a process is performed to turn the revolution limiter value $N_{HFC}$ to the value $N_{HFC2}$ for the high-speed valve timing.

The time set for each of the changeover delay timers described in the foregoing is predetermined from the response delay time for the changeover mechanism 13 of each cylinder to complete the required changeover operation as a result of the oil pressure change in the oil supplying passage 14. When the electromagnetic valve is changed over from the open position to the closed position, the program advances in order of step-17, step-20, step-22, step-24 and step-26 until the hydraulic switch 20 is turned on. Even with switch 20 turned on, the program is advanced in order of step-17, step-19, step-24, and step-26 until the changeover mechanism 13 of each cylinder has been changed to the low-speed valve timing mode of operation. Furthermore, when the changeover valve 16 is not moved to its closed position, even with an instruction to close the valve due to a malfunction of the electromagnetic valve 19 or the changeover valve 16, with the result that the hydraulic switch 20 remains unable to turn on no matter how long of a waiting period is allowed, the program is then advanced similarly in order of step-17, step-20, step-22, step-24, and step-26 as in the foregoing, indicating that unless the changeover mechanism 13 of each of the cylinders has been turned to the low-speed valve timing side, the fuel injection remains controlled to be suitable for the high-speed valve timing. When the electromagnetic valve 19 is changed over from the closed position to the open position, the fuel injection should remain controlled to be suitable for the low-speed valve timing in a like manner, as described above, unless the changeover mechanism 13 of each of the cylinders has been set to the high-speed valve timing mode of operation.

Also, when the fail safe operating is continuing, or the engine is being started or the time preset with the delay timer has not expired as yet after the start of the engine, or the engine warm-up is still continuing, or the vehicle is parked or running at a slow speed, as stated previously herein, the program is advanced to go from step-1 through step-3 or step-5 through step-6 to the step-27 to give an instruction to close the electromagnetic valve 19, and further to go from the step-27 to the step-21, step-23 and step-25 in that order. When the automatic transmission is in the N or P position, the program is advanced from the step-8 to the step-28 in which whether or not the $Ti_H$ map has been selected previously is determined. Then, when Ne is found to be smaller than $Ne_1$, the program is advanced from the step-9 to the step-29 at which a like determination or discrimination as made at the step-28 is carried out. If it is found that the $Ti_H$ map has been selected previously, the program is advanced from step-28 and step-29 to the step-15. If the $Ti_H$ map has not been selected previously for use, that is, when the changeover mechanism 1 3 of each of the cylinders has not been set to the high-speed valve timing mode of operation, the program advances in order of step-27, step-21, step-23 and step-25 as in the foregoing so that the fuel injection may be controlled for the low-speed valve timing irrespective of the hydraulic switch 20. This is a countermeasure designed to deal with the hydraulic switch in case the switch 20 should remain turned off due to a malfunction, such as a break in its wiring.

More specifically, $N_{HFC1}$ is set higher than $Ne_2$. Thus, normally, the valve timing is changed over to the high-speed valve timing before Ne has increased to $N_{HFC1}$, causing the $N_{HFC1}$ to be changed over to $N_{HFC2}$. Therefore, there is no fuel cut effected at $N_{HFC1}$. In the operating condition in which the program is advanced to go from the step-1 through step-8 to the step-27, however, the low-speed valve timing is retained even when Ne exceeds $Ne_2$ due to engine racing or the like so that a fuel cut is effected at $N_{HFC1}$. Further, this fuel cut at $N_{HFC1}$ goes on until $t_{HVT}$ becomes zero (0), that is, until the changeover mechanism 13 is actually set to the high-speed valve timing mode of operation, even after the low-speed valve timing has been changed over to the high-speed valve timing.

Figure 8:
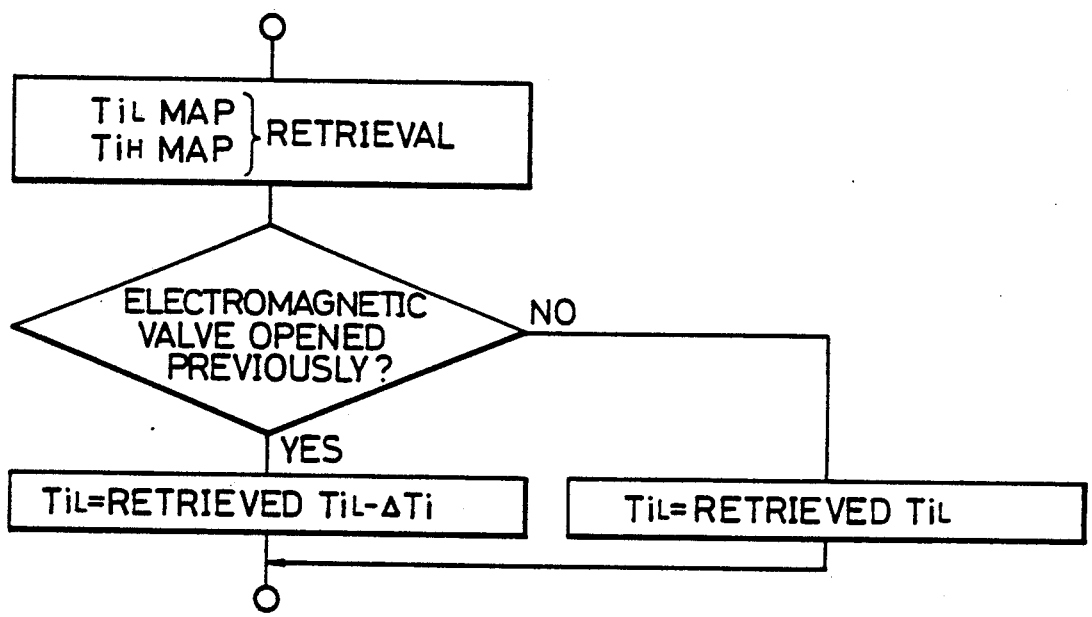
FIG. 8 is a flowchart of the subroutine for retrieval of the $Ti_L$ map and the $Ti_H$ map.

In the subroutine for retrieval of the $Ti_L$ map and the $Ti_H$ map at the step-10, whether or not an instruction to open the electromagnetic valve 19 has been previously given, is determined as indicated in FIG. 8. When it is found that the instruction to open the valve has not been given, the $Ti_L$ value to be used at the step-14 is taken as $Ti_1$ value retrieved from the $Ti_L$ map. When the instruction to open the valve has been given, a process to subtract a predetermined amount of hysteresis $\Delta Ti$ from the retrieved $Ti_L$ value is performed for using the balance as the $Ti_L$ and the changeover characteristic in Y region in FIG. 6 is then provided with the hysteresis.

Figure 9:
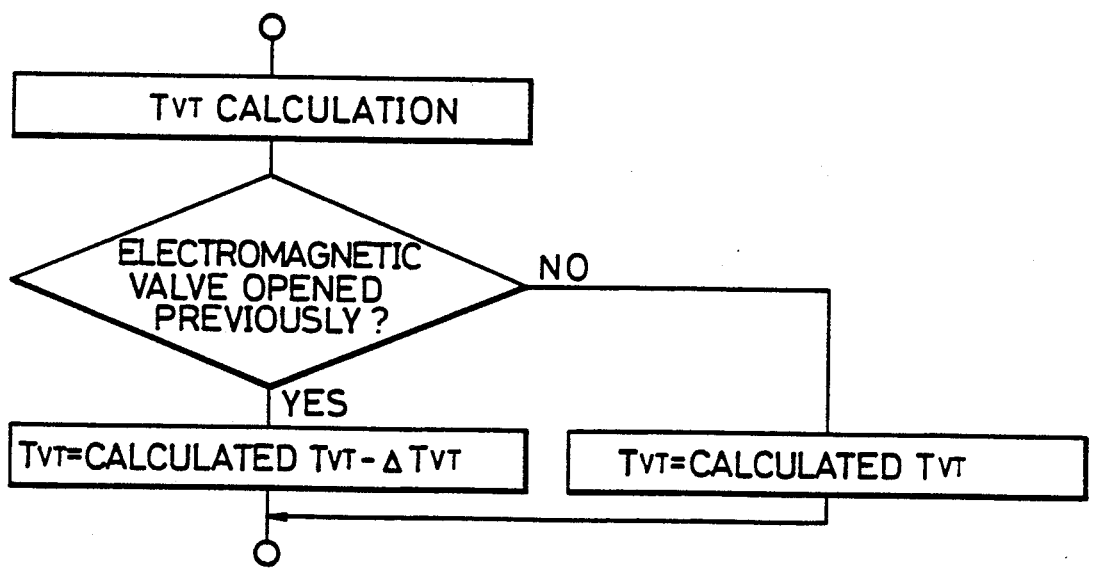
FIG. 9 is a flowchart of the subroutine for calculation of TiVT.

Also in the subroutine for calculation of $T_{VT}$ at the step-11, as shown in FIG. 9, whether or not the instruction to open the electromagnetic valve 19 has been given previously is determined. When the instruction to open the valve has not been given, the $T_{VT}$ to be used at the step-12 is one calculated from the $T_{VT}$ table. When the instruction to open the valve has been given, a process to subtract a predetermined amount of hysteresis $\Delta T_{VT}$ from the calculated value is performed for using the balance as the $T_{VT}$, and the changeover characteristic in X region in FIG. 6 is then provided with the hysteresis.

While the invention has been described in connection with a specific embodiment of an engine wherein the operating mechanism is capable of selective operation for two different engine speeds, namely, high-speed and low-speed, it is to be understood that the invention is equally applicable engine valve operating mechanisms capable of selective operation for more than two speeds and therefore "high-speed" and "low-speed" as used throughout the application, including the claims, shall mean any two different speeds between which a changeover may be made.

Furthermore, signals from the hydraulic switch 20 are used to determine whether the valve timing has been changed over normally. When any irregularity or abnormality occurs the valve timing changeover, a fail-safe operation such as an alarm, fuel reduction, suspension of the valve timing changeover control or the like is carried out. The subroutine for this fail-safe control operation is as shown in FIG. 10 and performed as follows. First, at a step-1, it is determined whether or not the, instruction given to the electromagnetic valve 19 at one of step-15, step-16 or step-17 in FIG. 7 is one instructing said valve 19 to open (that is, a command for a changeover to the high-speed valve timing). When the instruction is found to be an instruction to open the valve, the subroutine is advanced to step-2 or FIG. 10 to determine whether or not the hydraulic switch 20 is turned off. When the oil pressure is high (indicating the high-speed valve timing condition) and the hydraulic switch 20 is off, the subroutine is then advanced to the step-3 in which the remainder time t for the delay timer built into the electronic control circuit 7 is set to a predetermined time (for example, 0.4 seconds), thereby completing one round of the processing. When an instruction to close the valve (that is, a command for the low-speed valve timing) has been given, the subroutine program of FIG. 10 is advanced from the step-1 to the step-4 to determine whether or not the hydraulic switch 20 is on. When the oil pressure is low (indicating the low-speed valve timing condition) and the hydraulic switch 20 is on, the program is advanced to the step-5 to set the remainder time t to a predetermined time in like manner as mentioned above, thereby completing one round of the processing. The delay timer is automatically set to the initial setting when the ignition switch is turned on.

Now, assuming a condition wherein an instruction given out to the electromagnetic valve 19 is changed. At the initial moments following the instruction change, the hydraulic switch 20 still remains set in the condition existing prior to the changeover instruction due to a delay in the change of the oil pressure. Therefore, when the instruction is changed to one to open the valve, the program is advanced from the step-2 to the step-6 in FIG. 10, and when the instruction is changed to one to close the valve, the program is advanced to go from the step-4 to the step-6 and one round of the processing is then completed without doing anything until the remainder timer t for the delay timer is reduced to 0. When the remainder time t becomes 0, that is, when the hydraulic switch 20 is still retained in the position set prior to the changeover instruction even after the predetermined time starting from the outset of the changeover instruction has expired (which thereby includes an irregularity such as the valve 19 being stuck or clogged), the program is then advanced from the step-6 to the step-7 to indicate a valve timing changeover irregularity with an alarm or the like, and further, the program is advanced to the step-8 to execute controls such as a fuel reduction and others for the fail-safe purpose.

It is desirable to execute the fail-safe operation as soon as possible when a valve timing changeover irregularity occurs. In this example of the present invention, therefore, the hydraulic switch 20 is integrally built into the changeover valve 16 so that the hydraulic switch 20 may be turned on and off quickly by the operation of the changeover valve 16. This enables the predetermined time for the delay timer to be reduced to the shortest possible time.

As described in the foregoing, according to the present invention, when a valve timing changeover irregularity occurs due to a malfunction of the valve means or an oil leakage, such an irregularity is accurately determined and dealt with properly by taking necessary fail-safe countermeasures. Another advantage of the present invention is that the oil pressure detecting means is a conventional hydraulic switch, which is inexpensive for detecting and determining said changeover irregularity.

What is claimed is:

1. A method for detecting an irregularity in a valve-timing changeover system of a variable valve-timing engine, said changeover system comprising a hydraulically operated changeover mechanism for changing over the valve timing for at least one of either the intake valves or the exhaust valves in the engine, a changeover valve provided in an oil supplying passage for supplying oil to the changeover mechanism, a control valve provided in an oil passage for operating the changeover valve, and a control means employed to output a valve timing changeover instruction for operating the changeover valve through the control valve according to the operation condition of the engine, said method comprising steps of:

detecting oil pressure in a downstream portion of the changeover valve in the oil supplying passage,
   comparing the valve-timing changeover instruction given by the control means and the detected oil pressure,
   determining through said comparison an irregularity in operation of the changeover valve.

2. The method of claim 1, including the step of delaying said oil pressure detecting step for a predetermined time period after the valve-timing changeover instruction for making said comparison after said predetermined time period.

3. The method of claim 1, including the step of providing an alarm when an irregularity in operation of the changeover valve is determined.

4. A method for detecting an irregularity in a valve-timing changeover system of a variable valve-timing engine, said changeover system comprising a hydraulically operated changeover mechanism for changing over the valve timing for at least one of either the intake valves or the exhaust valves in the engine, a changeover valve provided in an oil supplying passage for supplying oil to the changeover mechanism, a control valve provided in an oil passage for operating the changeover valve, and a control means employed to output a valve timing changeover instruction for operating the changeover valve through the control valve according to the operation condition of the engine, said method comprising steps of:

detecting oil pressure in a downstream portion of the changeover valve in the oil supplying passage,
   determining whether the detected oil pressure has changed in compliance with the valve-timing changeover instruction given by the control means; and
   performing a fail-safe operation with respect to an irregularity in operation of the changeover valve determined when the detected oil pressure has not changed to one corresponding to the instruction after expiration of a predetermined or preset time.

* * * * *